Jan. 19, 1954  S. KURLANDSKY  2,666,803
BATTERY WITH CONDUCTIVE WAX INTERCELL CONNECTIONS
Filed May 13, 1950
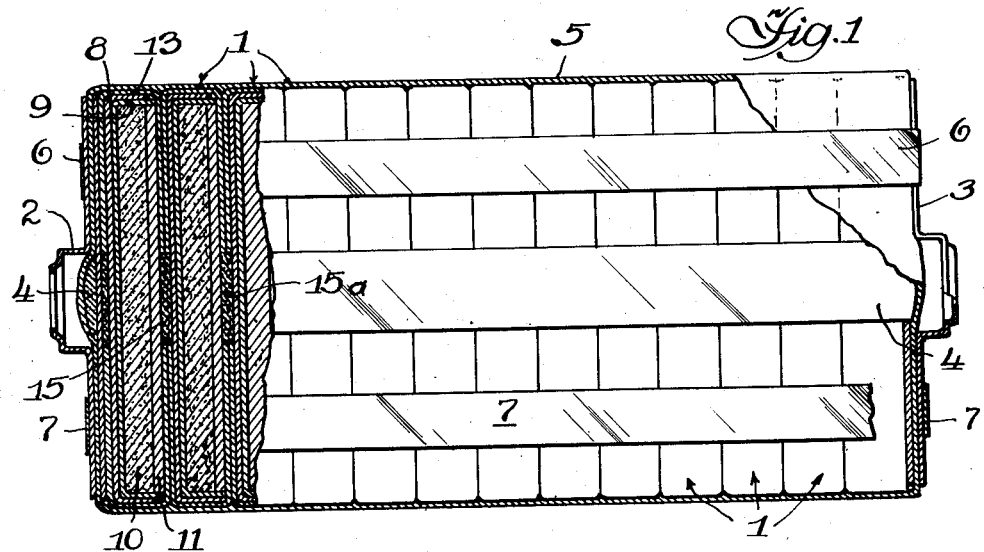
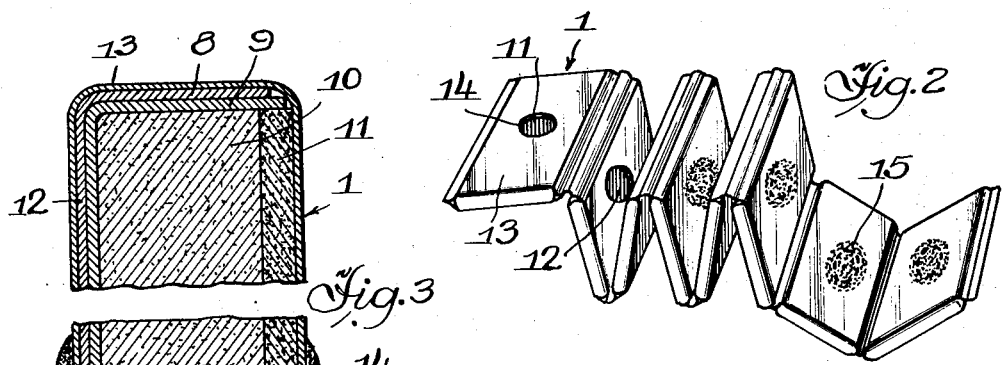
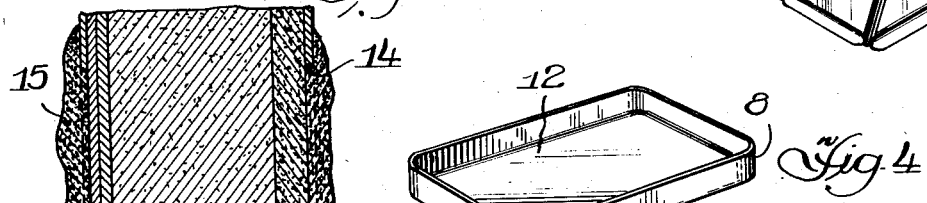
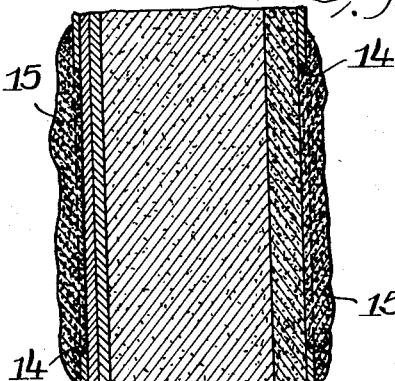
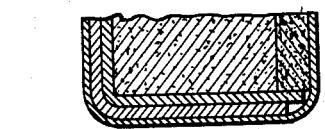
Inventor,
Sam Kurlandsky
By: Jones, Tesch and Darbo Attys.

Patented Jan. 19, 1954

2,666,803

UNITED STATES PATENT OFFICE 2,666,803

BATTERY WITH CONDUCTIVE WAX INTERCELL CONNECTIONS

Sam Kurlandsky, Freeport, Ill., assignor to Burgess Battery Company, Freeport, Ill., a corporation of Delaware Application May 13, 1950, Serial No. 161,892

11 Claims. (Cl. 136—135)

This invention relates to dry batteries and more particularly to the interconnection of the cells forming the battery by means of electrically conductive compositions having a waxy base and a moderate melting point.

Electric dry batteries are composed of a plurality of individual dry cells electrically interconnected in parallel or in series at the individual cell terminals to produce a battery with the desired electrical characteristics. Flat, cylindrical, or other cell shapes may be employed. Each cell has two electrodes which must be connected with the electrodes of other cells as a step in the manufacture of the battery.

Electrical connection between the terminals of the cells is commonly provided by means of a suitable solder which, generally with the aid of a flux, alloys or welds to a limited extent with the surfaces of the terminals. Conductive compositions, such as carbon impregnated varnishes or, more recently, silver paints and the like, have been used for this purpose. The use of solder has been restricted because of the difficulty of soldering to certain metals such as magnesium, the impossibility of soldering directly to carbon, the relatively high temperatures required which may adversely affect environmental materials and parts, and corrosion caused by the fluxes employed. Also, the soldering operation requires special equipment and careful technique.

The non-solder conductive compositions heretofore proposed for intercell connection have not been entirely satisfactory. The carbon impregnated materials exhibit low electrical conductance and the paint-like products require considerable time to dry or set. Solvents used sometimes cause trouble due to their effect on other materials and parts and evaporation of the solvent may result in undesirable porosity of the conductive mass. Once set, these compositions cannot be softened or liquefied without destruction or dissolution of the material.

The principal object of the invention is to provide a battery in which the internal electrical connections are made by means of an electrically conductive composition having a relatively high specific conductance and which is solid at room temperatures but melts at a moderately warm temperature to a fluid body of relatively low viscosity. A feature of the invention resides in the low level of the electrical resistance of such connections, this desirable objective being achieved without unduly extending the areas of the cell terminals covered by the conductive connecting composition.

In the accompanying drawing,

Fig. 1 is a side elevation, partly in section, of a battery embodying the invention;

Fig. 2 is a perspective view of a string of individual cells used in the fabrication of the battery of Fig. 1;

Fig. 3 is a cross-sectional view of one of the cells of the string shown in Fig. 2;

Fig. 4 is a perspective view of the metallic tray employed as one electrode of each cell, and Fig. 5 is a perspective view of a length of wire-form conductive composition used for the electrical interconnection of the cells of the battery in accordance with the invention.

The invention is applicable and useful in making internal connections of batteries composed of cells of any shape and employing any type of connecting elements, provided only that the terminals of the cells to be connected are contiguous and exposed to each other. Its advantages are probably most completely enjoyed in the electrical connection of the terminals of opposite polarity of a series of individually complete, flat cells arranged in juxtaposed relation. Accordingly, the invention is described in such an embodiment, the individual cells being enclosed within liquid-tight envelopes having small openings exposing the terminals at the opposed broad surfaces of the cells, these openings being filled with conductive wax compositions which serves to electrically connect the terminals and, if desired, to close the openings in the envelopes.

The battery illustrated in Fig. 1 consists of a stack of juxtaposed cells 1 electrically connected in series to furnish a desired voltage at battery terminals 2 and 3. The details of construction of each individual cell are shown in Fig. 3. The stack of cells is bound together by tape 4 which encircles the cell assembly at approximately the mid-section thereof. This assembly is entirely covered by a moisture-proof coating 5, as by spraying or dipping it in microcrystalline wax. The battery structure is then completed by the application of terminal plates 2 and 3 to which the terminals of the end cells of the stack are electrically connected by suitable means not shown, the battery terminals being held in place by tapes 6 and 7.

As shown in detail in Fig. 3, each individual cell 1 comprises a tray-shaped electrode-terminal 8 of zinc or other suitable metal, a paper liner or other suitable electrically insulating bibulous separator 9, an active mass 10 including depolarizer mix and electrolyte, and a positive terminal 11 of carbon, carbon impregnated fabric, or other suitable material. The chemical and physical attributes of these several elements of the cell are well known and understood and will not be further described herein except as required for the complete disclosure of the invention.

The face 12 of negative terminal 8 and positive terminal 11 are preferably rectangular in shape and define the opposite broad surfaces of the cells. The dimensions of terminal 11 are somewhat less than those of the rectangular face 12 of the negative terminal and the positive terminal is insulated from the latter by separator 9. The entire cell is enclosed within an envelope 13 of a film material which is resistant to the chemical action of the cell constituents. A suitable material for this purpose is a chlorinated rubber product commercially available under the trade name "Pliofilm." The individual cells, each of which is a complete electrical unit, may be independently wrapped, or they may be sealed in pockets in a continuous strip of the film material in a manner illustrated in Fig. 2. Small openings 14 are provided in the envelope either prior to or after the wrapping of the cells, these openings being located approximately at the centers of the opposite broad terminal surfaces of the wrapped cells. While it is convenient and preferable to locate these openings at approximately the centers of the terminal surfaces, they may be elsewhere located, provided only that the openings of adjacent cells in the battery stack are approximately in register. When the cells are sealed in a continuous strip of the film material, every other cell is oriented with its negative terminal on one side of the strip with the remaining alternate cells arranged with their positive terminals on the other side of the strip so that when the strip is accordion-folded in the assembly of the cells into a battery, the terminals to be connected in series will be facing each other.

When the cells so assembled have been wrapped, they are ready for use in manufacturing the battery units. As the first step in the assembly of the battery, a quantity of the electrically conductive wax composition hereinafter more fully described is applied to the cell terminal surfaces 11 and 12 through openings 14 in envelope 13. If it is desired that the conductive wax composition shall serve to seal as well as electrically connect the cells, the amount of cement applied should be sufficient to cover not only the areas of the cell terminals exposed by openings 14, but also a portion of the film material at the peripheries of the openings. The masses of conductive wax composition so applied are shown at 15 in Figs. 2 and 3. If desired, the wax may be applied only to all positive terminals, to all negative terminals, or to both terminals of alternate cells in the stack, the quantity of the wax composition applied being sufficient to engage the opposite terminal of an adjacent cell when the cells are brought together in the battery unit.

The conductive composition 15 serves to electrically connect the cells of the battery in a manner more fully described below. This composition comprises essentially a waxy base impregnated with finely divided silver. The waxy base acts as a binder for the silver particles, the product being a coherent mass which may be extruded into wire form, as shown in Fig. 5, for convenient use. In addition, the waxy base serves as a lubricant which promotes fluid motion of the mass and the individual silver particles with respect to each other in both the manufacture and the use of the composition.

The high electrical conductivity of the silver-waxy base composition appears to depend largely upon the high ratio of silver to base material. The peculiar characteristics of the waxy binder-lubricants used as the base material in preparing these compositions permit the very heavy loading of the binder-lubricant with silver within the limit of adequate cohesion of the mass in both solid and fluid states. Lubrication furnished by the waxy material appears to facilitate the relative movement of the particles and permit their orientation into a crowded pattern within the mass with a high ratio of silver to binder.

The proportion of silver that will be taken up by the base material appears to depend, at least in part, upon the form of the silver particles, as well as upon the characteristics of the binder-lubricant base material. It has been found that microcrystalline wax, for example, will absorb and bind together as much as about four times its own weight of precipitated silver, resulting in a product which is approximately 80% silver and 20% binder. This product is highly conductive.

The silver load capacity of a composition made from precipitated silver may be increased and the conductance greatly improved by pre-treatment of the silver particles. An average sample of commercial precipitated silver may have a size range of from 2 to 100 microns and an apparent density of about 1½ grams per cubic centimeter. The milling of this material by any suitable means as, for example, in a ball mill, reduces the average particle size and increases the apparent density of a given quantity of the silver particles. It is evident that the porosity of the individual particles and surface form thereof are altered as the particles are worked during the milling operation.

By continuing the milling of the precipitated silver for a sufficient length of time, the apparent density of the silver particles can be increased from 1.5 to 4.0 grams per cubic centimeter, and even higher. The mill ground product may range in particle size from 2 to 50 microns. This mechanically treated silver powder is taken up by the waxy binder-lubricant to the extent of 85% to 90% of the weight of the resulting composition. The resulting increase in specific conductance of the composition is substantially in excess of the increase in the proportion of silver, the conductivity characteristic of the composition increasing steeply as the amount of silver in the composition approaches the saturation point; that is, the point beyond which the mass is no longer coherent. Thus, it is desirable to load or saturate the base material with silver in preparing the conductive composition.

Although microcrystalline wax is the preferred base for the conductive compositions employed in the interconnection of the cells of the battery, other waxy binder-lubricants may be used with satisfactory results. Examples of other suitable materials are as follows: beeswax, paraffin, candelilla, montan, ceresin, carnauba, Brazil, ozocerite. The characteristics of these materials which appear to be of greatest importance include a rather sharp melting point and transition from solid to highly fluid state, chemical stability at elevated temperatures, and lubrication qualities.

The silver load capacities of compositions employing a soft wax, such as microcrystalline or beeswax, can be further enhanced by the use of a minor proportion of a hard wax, such as carnauba or candelilla, to form a binder-lubricant mixture. The proportions used are not critical, a ratio of four parts of soft to one part of hard wax being satisfactory.

In preparing the preferred composition, precipitated silver powder is milled in a ball mill until the apparent density of the material is about 4 grams per cubic centimeter. The quantity of binder-lubricant (4 parts of microcrystalline to 1 part of carnauba wax) required to prepare the desired amount of conductive composition, say 10 grams, is weighed out and melted. A proportionate amount of the ball milled precipitated silver, say 110 grams, is then added slowly to the molten wax with continuous stirring while keeping the mixture warm and mobile. When all of the silver has been incorporated into the mass, it is cooled and may be extruded in wire form or otherwise prepared for convenient storage and handling.

It should be here pointed out that the silver particles used in the conductive compositions may be prepared by the dry reduction of oxides of silver, by spraying, by an electrolytic process, and by other processes, as well as by chemical precipitation. The characteristics of the compositions made from the different forms of silver particles differ somewhat, but useful compositions may be prepared from any of these several forms of raw material.

In applying the conductive wax composition to terminals 11 and 12 of the cells, a procedure similar to that employed in a soldering operation may conveniently be followed, except that it is only necessary to moderately warm the waxy composition and no flux is required. Since the composition is not sufficiently adhesive to serve as a mechanical bonding agent in physically holding the cells together in the battery, tape 4 is employed for this purpose. The composition will adhere to the cell terminal surfaces sufficiently to hold the masses 15 in position while the cells are brought together in stacked relation during the process of manufacture of the battery. Either the cells may be brought together immediately upon the application of the connecting composition and while the material is still soft, or, as will generally be more convenient, the connecting masses 15 may be permitted to cool and the cells used as production schedules require for the completion of the battery. A suitable manufacturing procedure is to stack the cells and place the assembly in a suitable warming mold whereby the conductive composition is softened and the separate applications of the conductive composition to adjacent cells are merged into a single coherent mass 15a. At the same time, the Pliofilm envelopes are molded to a smooth contour. If desired, a turn or two of Pliofilm around the battery may be used to hold the corners of the envelopes smoothly in place. The cell assembly, bound together by tape 4, is then dipped into a bath of microcrystalline wax, for example, which forms a final moisture-resistant coating. The battery is then completed in the manner above described.

A characteristic of major importance in the conductive compositions employed for the electrical connection of the cells of the battery is their electrical conductivity. It is desirable, of course, to approach as nearly as possible the conductivity of solder in order that highly conductive electrical connections may be made without unduly extending the cross-sectional area of the conductive composition through which the current must flow. Known compositions having relatively low conductivities, such as the carbon or graphite filled linseed oil, varnishes, and the like, enjoy very limited applications because they must be applied to large surfaces and maintain large cross-sectional areas through which the electrical current may flow in order to provide sufficient conductance. The compositions herein described are not subject to this handicap and may be used more like solder itself as a consequence of their high conductivity.

Those compositions herein described which incorporate unmilled precipitated silver in microcrystalline wax exhibit specific conductances in excess of 65 reciprocal ohm-centimeters, those made from mill ground silver in microcrystalline wax in excess of 650 reciprocal ohm-centimeters, those made from mill ground silver in mixed soft and hard wax in excess of 1200 reciprocal ohm-centimeters. These compositions become quite fluid when moderately heated, being thus easily applied with simple equipment, and cool and set almost immediately. They seal the surfaces to which they are applied and effectively connect to conductors such as magnesium, aluminum and carbon to which soldering is difficult or impossible.

Invention is claimed as follows:

1. In a battery comprising a plurality of juxtaposed cells, each cell having a pair of opposite terminals, the combination comprising terminals of two adjacent cells arranged contiguous and exposed to each other, and a coherent composition of finely divided silver in a waxy binder-lubricant directly contacting said contiguous terminals and electrically connecting said terminals to each other, the amount of silver incorporated in said composition being such that the conductance of said composition is in excess of 65 reciprocal ohm-centimeters.

2. A battery structure as claimed in claim 1 in which the proportion of silver in the composition is at least 80% by weight.

3. A battery structure as claimed in claim 1 in which the binder-lubricant is a wax selected from the group consisting of microcrystalline, paraffin, beeswax, candelilla, montan, ceresin, carnauba, Brazil and ozocerite.

4. A battery structure as claimed in claim 1 in which the silver particles in the composition have been formed by chemical precipitation followed by milling.

5. In a battery comprising a plurality of juxtaposed cells, each cell having a pair of broad-surfaced opposite electrodes, the combination comprising opposite electrodes of two adjacent cells arranged contiguous and exposed to each other, and a coherent composition of finely divided silver and a waxy binder-lubricant between and directly contacting said contiguous electrodes and electrically connecting said terminals to each other, the silver constituting at least 80% of the weight of the composition.

6. In a battery comprising a plurality of juxtaposed cells, each cell having a pair of opposite terminals, the combination comprising opposite terminals of two adjacent cells arranged contiguous and exposed to each other, and a coherent composition of finely divided silver and a waxy binder-lubricant directly contacting said contiguous terminals and electrically connecting said terminals to each other, the specific conductance of said composition being in excess of 65 reciprocal ohm-centimeters.

7. In a battery comprising a plurality of juxtaposed cells, each cell having a pair of opposite terminals, the combination comprising opposite terminals of two adjacent cells arranged contiguous and exposed to each other, and a coherent composition of finely divided silver and a waxy binder-lubricant directly contacting said contiguous terminals and electrically connecting said terminals to each other, the specific conductance of said composition being in excess of 650 reciprocal ohm-centimeters.

8. In a battery comprising a plurality of juxtaposed cells, each cell having a pair of opposite terminals, the combination comprising opposite terminals of two adjacent cells arranged contiguous and exposed to each other, and a coherent composition of finely divided silver and a waxy binder-lubricant directly contacting said contiguous terminals and electrically connecting said terminals to each other, the specific conductance of said composition being in excess of 1200 reciprocal ohm-centimeters.

9. In a battery comprising a plurality of juxtaposed cells, each cell having a pair of opposite terminals, the combination comprising opposite terminals of two adjacent cells arranged contiguous and exposed to each other, and a coherent composition of microcrystalline wax loaded with finely divided silver directly contacting and electrically connecting said terminals.

10. In a battery comprising a plurality of juxtaposed cells, each cell having a pair of opposite terminals, the combination comprising opposite terminals of two adjacent cells arranged contiguous and exposed to each other, and a coherent composition of microcrystalline wax loaded with milled precipitated silver directly contacting and electrically connecting said terminals.

11. In a battery comprising a plurality of juxtaposed cells, each cell having a pair of opposite terminals, the combination comprising opposite terminals of two adjacent cells arranged contiguous and exposed to each other, and a coherent composition comprising a binder-lubricant consisting of a mixture of hard and soft waxes impregnated with finely divided silver, said composition directly contacting and electrically connecting said terminals.

SAM KURLANDSKY.

References Cited in the file of this patent

UNITED STATES PATENTS

| Number | Name | Date |
|---|---|---|
| 1,717,171 | Schorger | June 11, 1929 |
| 1,737,130 | Storey et al. | Nov. 26, 1929 |
| 2,423,290 | Bonwitt | July 1, 1947 |
| 2,444,034 | Collings et al. | June 29, 1948 |
| 2,475,152 | Rock | July 5, 1949 |
| 2,487,985 | Ruben | Nov. 15, 1949 |
| 2,519,054 | Woodring | Aug. 15, 1950 |
| 2,519,527 | Wilkinson | Aug. 22, 1950 |